Sept. 10, 1929.  R. DIETZE  1,728,044
ELECTRICAL DISTRIBUTION SYSTEM
Filed March 16, 1928
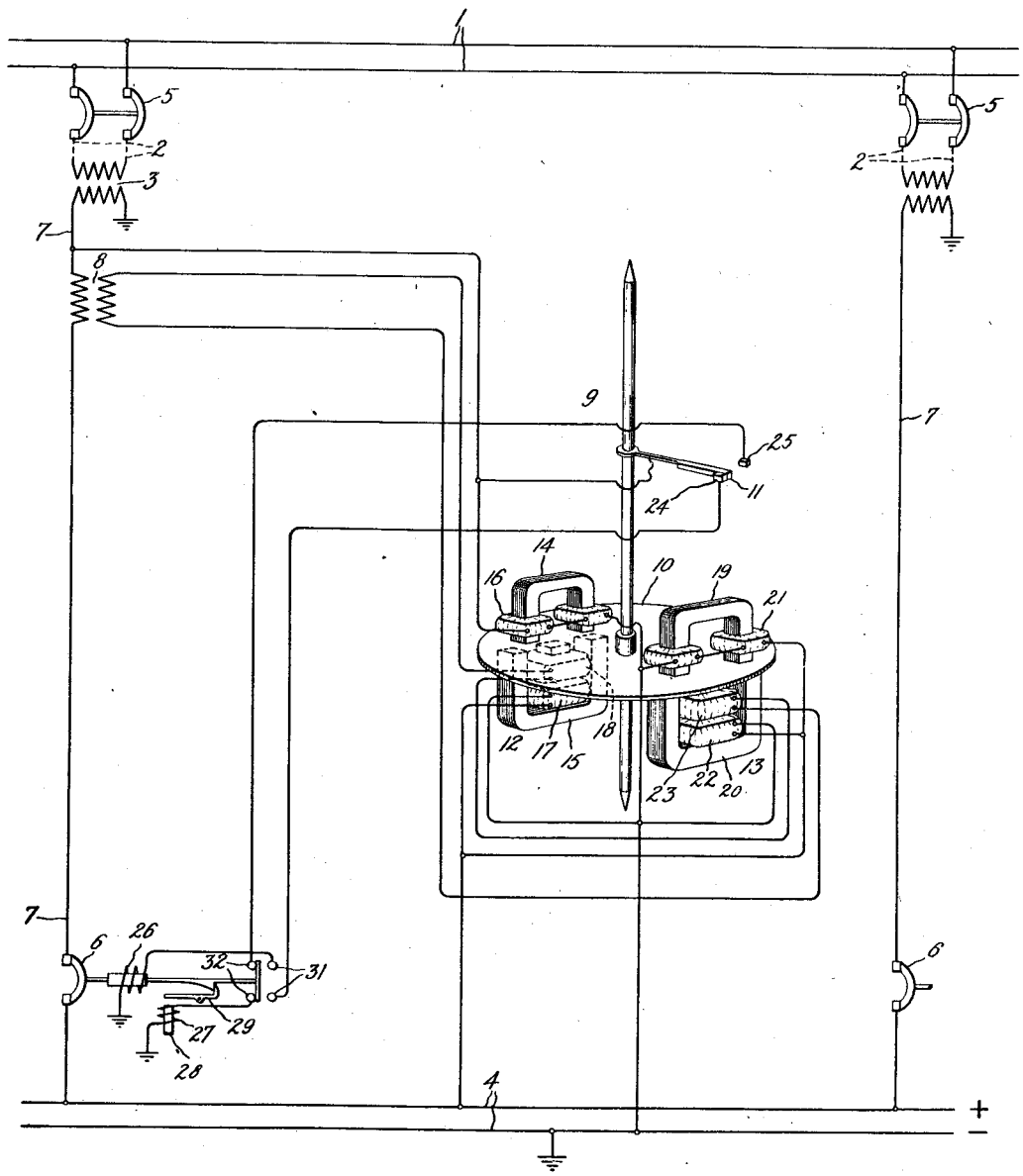
Inventor:
Richard Dietze,
by Charles E. Tullar
His Attorney.

Patented Sept. 10, 1929.

1,728,044

UNITED STATES PATENT OFFICE.

RICHARD DIETZE, OF BERLIN-PANKOW, GERMANY, ASSIGNOR TO GENERAL ELECTRIC COMPANY, A CORPORATION OF NEW YORK.

ELECTRICAL DISTRIBUTION SYSTEM.

Application filed March 16, 1928, Serial No. 262,259, and in Germany April 14, 1927.

My invention relates to electrical distribution systems and particularly to alternating current distribution systems in which high voltage feeders supply distribution transformers interconnected on their low voltage sides to form an alternating current network.

In an alternating current distribution system provided with a plurality of high voltage feeders a failure in one of the feeders does not necessarily cause a failure of the power supplied to the network since the sound feeders may be capable of maintaining continuity of service. However, if a feeder is disconnected at its source of supply or a short-circuit occurs on the feeder a reversal of energy flow will occur in that feeder as a result of the network supplying the magnetizing current for the transformers or as a result of the network feeding power into a fault or short-circuit on the feeder or in the transformer. It then becomes necessary to disconnect the distribution transformers to prevent feed back of energy from the network. It is also desirable to reconnect the distribution transformer to the network when normal conditions have been restored on the feeder.

One object of my invention is to provide an improved arrangement for automatically effecting the disconnection of distribution transformers from a network on a reversal of energy flow through the transformer and for reconnecting the transformers to the network when normal conditions have been restored.

For the purpose of explaining the present invention it has been illustrated in the accompanying drawing as applied to an alternating current distribution with an interconnected secondary system but it will be understood that it may be applied to other systems of electrical distribution and in general to two interconnected alternating current circuits which are subject to a reversal of energy flow between them.

My invention will be better understood from the following description taken in connection with the accompanying drawing in which the single figure is a schematic illustration of an alternating current distribution system in which my invention has been embodied and its scope will be pointed out in the appended claims.

Referring to the drawing, 1 indicates the primary high voltage mains of a distribution system connected to high voltage feeders 2 supplying distribution transformer 3 which are interconnected on their low voltage sides by the distribution network 4. In order to simplify the disclosure I have shown the network as having one side thereof permanently connected to ground. Suitable switching means such as circuit breakers 5, which may be of any suitable type examples of which are well-known in the art, are provided in the main feeders 2 while other suitable switching means such as the network circuit breakers 6 are provided in the low voltage mains 7 between the secondaries of the distribution transformers 3 and the network 4. In order to simplify the disclosure single phase feeders are shown and only one feeder is shown equipped with the apparatus for effecting the automatic disconnection and reconnection of the transformer secondary but it will be understood that each feeder or any desirable number of feeders may be similarly equipped.

The opening and reclosing of a circuit breaker 6 is controlled by n induction relay 9 of the so-called watt or power type and comprises a movable conducting member such as a disk 10 by the movement of which the contact controlling member 11 is actuated. The movement of the disk 10 is effected by two motor elements 12 and 13 which are arranged to exert independent torques on the disk 10. The motor element 12 comprises the magnetic members or cores 14 and 15 between the pole faces of which the disk 10 is interposed so as to be rotatable across the magnetic fields of the cores. On the magnetic members 14 and 15 are mounted, in any suitable manner examples of which are well-known in the art, the voltage windings 16 and 17 which are respectively connected across the secondary of the transformer 3 and the network 4 so that they are responsive to the voltages thereof and a cooperating current winding 18 which is connected to the secondary of the current transformer 8 the primary of which is in series between the circuit breaker 6 and the transformer 3 so that the current winding 18 is energized in response to the current flowing through the circuit breaker 6.

The motor element 13 comprises the magnetic members or cores 19 and 20 between the pole faces of which the disk 10 is interposed so as to be rotatable across the magnetic fields of the cores. On the magnetic members 19 and 20 are mounted in any suitable manner the voltage windings 21 and 22 which are connected across the network 4 so as to be responsive to the voltage thereof and a cooperating current winding 23 which is connected to the secondary of the current transformer 8 so as to be energized in response to the current flowing through the switch 6.

The windings 16 and 17 of the motor element 12 are so arranged that when they are energized by voltages which are equal in phase and magnitude and the current winding 18 is energized, which is the existing condition when circuit breaker 6 is closed, a torque which varies in accordance with the direction of the current flow through the circuit breaker 6 is exerted on the disk 10. Similarly the windings 21, 22 and 23 of the motor elements are arranged so that a torque which varies in accordance with the direction of current flow through the circuit breaker 6 is exerted on the disk 10 when the switch 6 is closed. The motor elements 12 and 13 are arranged so that when current flows from the transformer 3 to the network 4 both of these elements exert a torque in a direction to maintain the contact controlling member 11 in engagement with contact 24 and when the current reverses through the circuit breaker 6 both of the elements exert a torque in a direction to maintain the contact controlling member 11 in engagement with the contact 25.

When the circuit breaker 6 is open so that the current windings 18 and 23 are deenergized, the windings 16 and 17 are arranged to exert on the disk 10 a torque which is in a direction to maintain the contacts controlling member 11 in engagement with contacts 24, and which is a function of the product of the voltages of the transformer 3 and the network 4 and the sine of the angle between the voltages. At the same time the windings 21 and 22 are arranged to exert on the disk 10 a torque which is in a direction to maintain the contact controlling member 11 in engagement with the contacts 25 and which is a function of the square of the network voltage.

Therefore, when the circuit breaker 6 is open the contacts controlling member 11 remains in engagement with contacts 25 until the phase and magnitude of the transformer secondary voltage is such that the torque exerted by the motor element 12 exceeds the torque exerted by the motor element 13.

As shown the circuit breaker 6 is of the well-known latched-in type and is provided with the closing coil 26 and a trip coil 27 having a plunger 28 to disengage a latch 29 which holds the circuit breaker closed. The circuit breaker 6 is also provided with auxiliary contacts 31 which are connected in series with contact 24 of the relay 9 in the circuit of the closing coil 26 and with the auxiliary contacts 32 which are connected in series with contact 25 in the circuit of the trip coil 28.

It will be obvious to those skilled in the art that when polyphase feeders are used a separate relay 9 may be provided for each phase and the contacts of the relay 9 may be interconnected in a manner well-known in the art so that whenever any one of the contact controlling members 11 is in engagement with its contacts 25 the circuit of the trip coil 27 is completed and the circuit of the closing coil 26 is completed only when contact controlling members of all of the relays 9 are in engagement with their contacts 24.

The operation of the arrangement shown in the drawing is as follows: Assume that the network 4 is energized by one of the other feeders and that the circuit breakers 5 and 6 in the feeder which is equipped with the automatic reclosing equipment are in their open positions. Under these conditions the voltage windings 17, 21 and 22 of the relay 9 are energized from the network 4 and the voltage winding 16 and the current windings 18 and 23 of the relay are deenergized. Therefore, the torque exerted by the motor element 12 is zero whereas the motor element 13 is exerting on the disk 10 a torque which depends upon a function of the square of the network voltage and which is in a direction to maintain the contact controlling member 11 in engagement with the contact 25. Therefore, under the conditions assumed the contact controlling member 11 is in engagement with the contact 25. Since the circuit breaker 6 is open the circuit of the trip coil 27 is open at this time at the auxiliary contacts 32 on the circuit breaker.

Assume now that the circuit breaker 5 is moved to its closed position so that the distribution transformer 3 is energized from the supply circuit 1. The voltage winding 16 which is connected across the secondary of the distribution transformer 3 is now energized so that the motor element 12 of relay 9 exerts a torque on the disk in opposition to the torque exerted by the motor element 13. When the transformer secondary voltage bears a predetermined relation to the network voltage such for example when it is slightly greater and substantially in phase with the network voltage, the torque exerted by the motor element 12 exceeds the torque exerted by the motor element 13 so that the contact controlling member 11 is moved out of engagement with contact 25 and is moved into engagement with contact 24. The engagement of member 11 with contact 24 completes the circuit of the closing coil 26 of the circuit breaker 6 across the secondary of the distribution transformer 3 so that the circuit breaker 6 closes and connects the transformer 3 to the network. The circuit of the closing coil 26 also includes the auxiliary contacts 31 on the circuit breaker. These auxiliary contacts are opened as soon as the circuit breaker is closed. After the circuit breaker has been closed it is held in its closed position by the latch 29.

When the circuit breaker 6 is closed and power flows from the transformer secondary to the network the currents in the current windings 18 and 23 are in the proper direction to cause both of the motor elements 12 and 13 of the relay 9 to exert torques in a direction to maintain the contact controlling member 11 in engagement with contact 24. Therefore, the circuit breaker 6 remains closed as long as power flows from the transformer 3 to the network 4.

Let it be assumed now that the circuit breaker 5 is opened so that the transformer 3 receives its magnetizing current from the network 4. Under these conditions the direction of power flow through the circuit breaker 6 reverses so that the current through the current windings 18 and 23 of the relay 9 also reverses. Consequently the torques exerted by both of the motor elements 12 and 13 reverse so that the contact controlling member 11 is moved out of engagement with contact 24 and is moved into engagement with contact 25. In response to the engagement of contact controlling member 11 with contact 25 a circuit is completed for the trip coil 27 which actuates its plunger 28 to disengage latch 29, so that the circuit breaker 6 moves to its open position. This circuit of the trip coil 27 is across the secondary of the transformer 3 and also includes the auxiliary contacts 32 on the circuit breaker 6 which are opened when the circuit breaker is open.

A similar cycle of operation takes place when reversal of power flow occurs due to a fault or short-circuit on the high tension feeder 2 or in the transformer 3.

After the circuit breaker 6 opens, it will be reclosed again automatically when the magnitude and phase of the transformer secondary voltage is such as to cause the torque exerted by the motor element 12 of the relay 9 to exceed the torque exerted by the motor element 13.

While I have in accordance with the patent statutes shown and described my invention as applied to a particular system and as embodying various devices diagrammatically indicated changes and modifications will be obvious to those skilled in the art and I, therefore, aim in the appended claims to cover all such changes and modifications as fall within the true spirit and scope of my invention.

What I claim as new and desire to secure by Letters Patent of the United States, is:—

1. In a system of electric distribution comprising two alternating current circuits, and switching means for connecting said circuits, the combination of means for effecting the automatic opening and reclosing of said switching means comprising a rotatable member and two induction motor elements for exerting independent torques thereon and having windings connected to said circuits in such a manner that both of said motor elements exert torques in the same direction on said member in accordance with the direction of power flow through said switching means when it is closed and exert opposing torques on said member in accordance with the relative voltages of said circuits when said switching means is open.

2. In a system of electric distribution comprising two alternating current circuits, and switching means for connecting said circuits, the combination of means for effecting the automatic opening and reclosing of said switching means comprising a rotatable member and two induction motor elements for exerting independent torques thereon, one of said motor elements comprising two cooperating voltage windings respectively responsive to the voltages of said circuits and a cooperating current winding arranged to be energized in accordance with the current flowing through said switching means, the other of said motor elements comprising two cooperating voltage windings responsive to the voltage of one of said circuits and a cooperating current winding arranged to be energized in accordance with the current flowing through said switching means.

3. In a system of electric distribution comprising an alternating current feeder circuit, a load circuit, a transformer connected between said feeder and load circuits, and a switch in the secondary circuit of said transformer, the combination of a relay for controlling the opening and reclosing of said switch comprising a movable conducting member, an induction motor element in inductive relation with said member comprising two cooperating voltage windings respectively energized in accordance with the voltages of said circuits and an associated current winding connected in series relation with said transformer secondary and load circuit, and another induction motor element in inductive relation with said member comprising two cooperating voltage windings respectively energized in accordance with the voltage of one of said circuits and a cooperating current winding connected in series relation with said transformer secondary and the load circuit.

4. In a system of electric distribution comprising two alternating current circuits and switching means for connecting said circuits, the combination of means for effecting the automatic opening and reclosing of said switching means comprising a rotatable member and two induction motor elements for exerting independent torques on the said rotatable member, one of said motor elements comprising cooperating windings connected to said circuits so as to exert on said rotatable member a torque which varies in accordance with the direction of power flow through said switching means when closed and a torque which varies in accordance with a function of the product of the voltages of said circuits and the sine of the angle between them when said switching means is open, the other of said motor elements comprising cooperating windings connected to said circuits so as to exert on said rotatable member a torque which varies in accordance with the direction of power flow through said switching means when closed and a torque which varies in accordance with the square of the voltage of one of said circuits when said switching means is open, said element being arranged so that the torques they exert on said rotatable member are in the same direction when said switching means is closed and are in opposition when said switching means is open.

5. In a system of electric distribution comprising an alternating current feeder circuit, a load circuit, a transformer connected between said feeder and load circuits and a switch in the secondary circuit of said transformer, the combination of a relay for controlling the closing of said switch comprising a movable conducting member and two induction motor elements for exerting opposing torques on said member, one of said elements comprising coooperating windings respectively connected to said transformer secondary and said network so as to exert on said movable member a torque dependent upon the relative phases and magnitudes of the voltages of the transformer secondary and the network and the other of said elements comprising cooperating windings connected to said network so as to exert on said movable member a torque dependent upon the square of the network voltage.

6. In a system of electric distribution comprising two alternating current circuits and switching means for connecting said circuits, the combination of means for effecting the automatic closing of said switching means comprising a rotatable member and two induction motor elements for exerting opposing torques on said rotatable member, one of said elements comprising cooperating windings respectively connected across said circuits so as to exert on said movable member a torque dependent upon the relative phases and magnitudes of the voltages of said circuits and the other of said elements comprising cooperating windings connected across one of said circuits so as to exert on said movable member a torque dependent upon the voltage of said one of said circuits.

In witness whereof, I have hereunto set my hand this 27th day of February, 1928.

RICHARD DIETZE.